Dec. 14, 1948.  A. M. NELSON  2,456,013
COLLAPSIBLE TRAILER
Filed Sept. 27, 1946  3 Sheets-Sheet 1
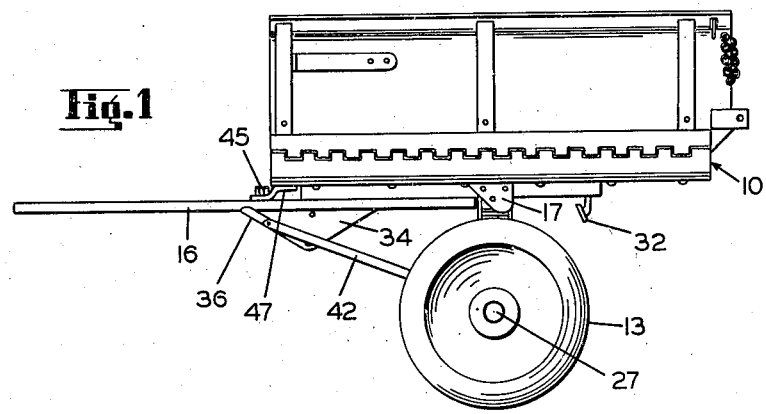
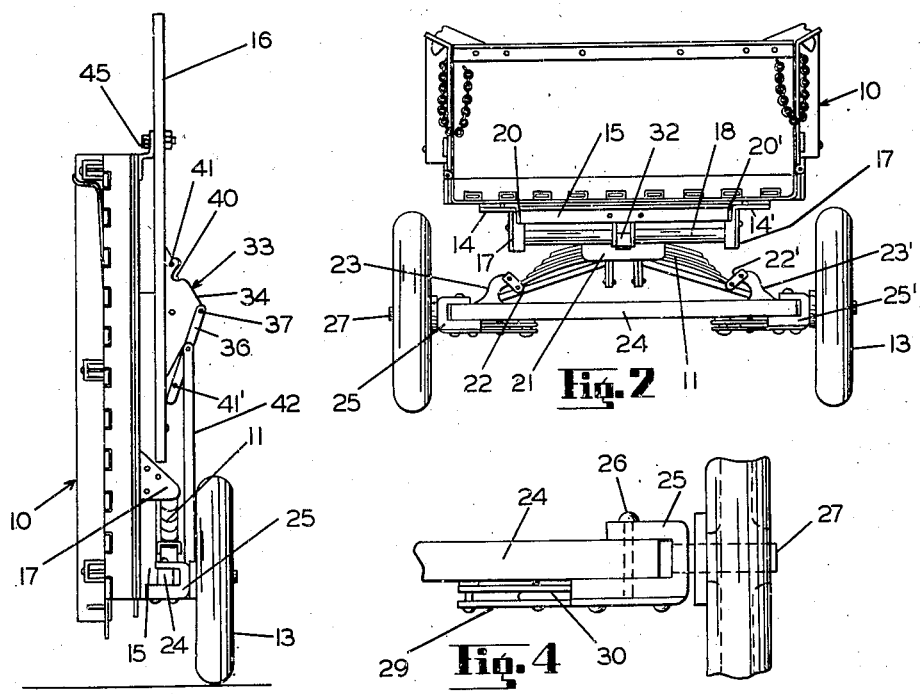
INVENTOR.
ADELBERT M. NELSON, DECEASED.
BY MINNIE WITT, EXECUTRIX.
BY
Christian R. Nielsen
ATTORNEY.

Dec. 14, 1948.                    A. M. NELSON                    2,456,013
                               COLLAPSIBLE TRAILER
Filed Sept. 27, 1946                                           3 Sheets-Sheet 2
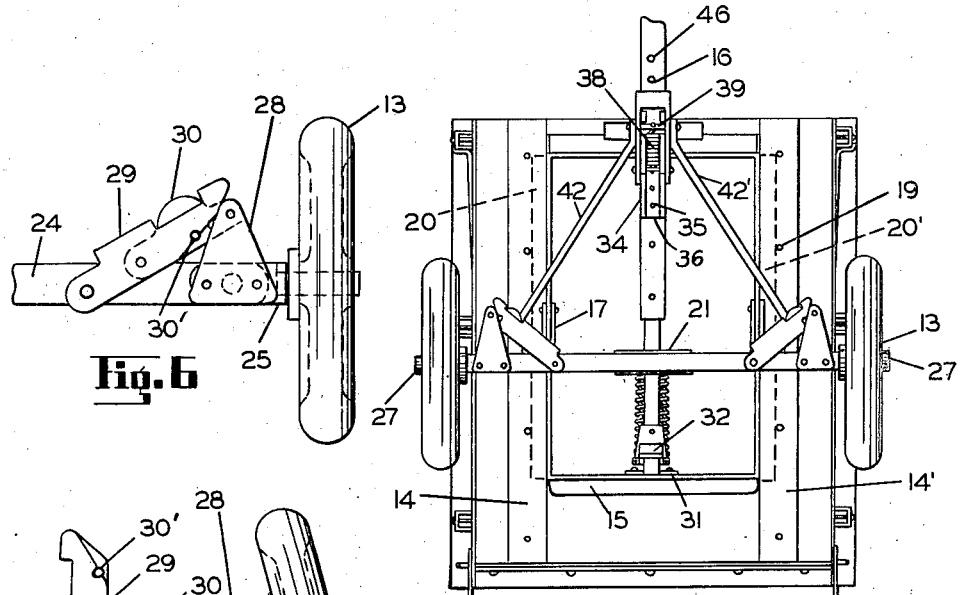
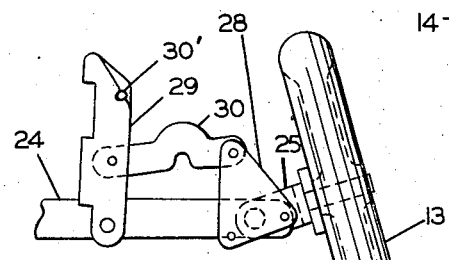
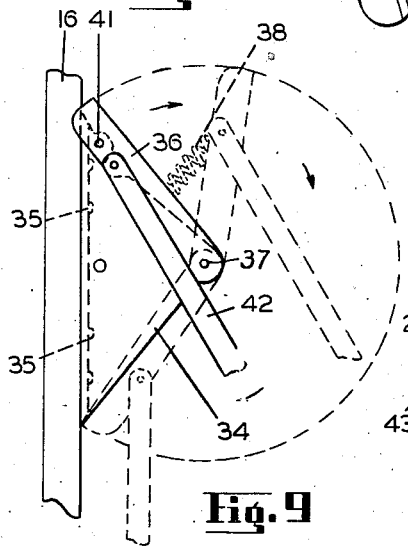
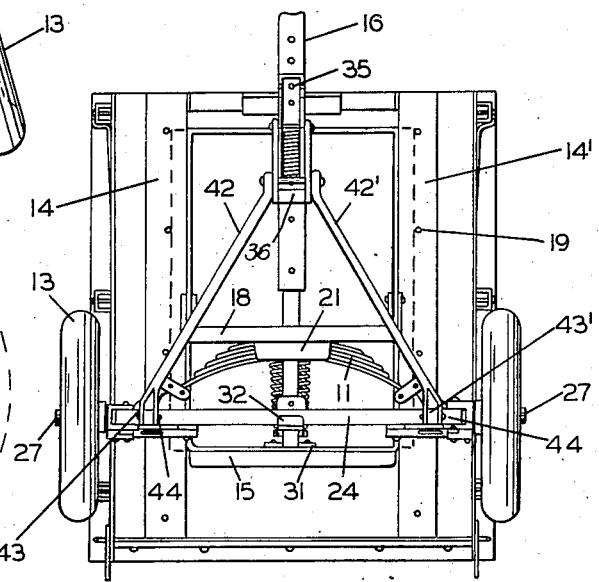
INVENTOR.
ADELBERT M. NELSON, DECEASED.
BY MINNIE WITT, EXECUTRIX.
BY
Christian R. Nielsen
ATTORNEY.

Dec. 14, 1948.  A. M. NELSON  2,456,013
COLLAPSIBLE TRAILER

Filed Sept. 27, 1946  3 Sheets-Sheet 3

INVENTOR.
ADELBERT M. NELSON, DECEASED.
BY MINNIE WITT, EXECUTRIX.
BY
Christian R. Nielsen
ATTORNEY.

Patented Dec. 14, 1948

2,456,013

UNITED STATES PATENT OFFICE 2,456,013

COLLAPSIBLE TRAILER

Adelbert M. Nelson, deceased, late of Milwaukee, Wis., by Minnie Witt, executrix, Milwaukee, Wis.

Application September 27, 1946, Serial No. 699,809

5 Claims. (Cl. 280—36)

This invention relates to trailers and more particularly to a type of trailer that may be readily attached to the rear of any type of vehicle.

An object of the invention is to provide a trailer that may be easily attached or detached without any extensive mechanical changes.

Another object of the invention is to provide a trailer that may be folded into a compact unit when not in use.

Still another object of the invention is to provide a trailer that can be equipped with a body unit that may be folded compactly, to conserve space when the trailer is not in use.

A still further object of the invention is to provide a trailer that may be folded in a manner so that the wheels in a folded position may be employed for conveying the folded unit into a convenient storage space.

A further object of the invention is to provide a trailer that may be locked in either an opened or closed position for safety.

It is manifest to anyone familiar with trailers and their use that they are very often clumsy and cumbersome in structure and do not readily adapt themselves for storage in a small amount of space, and very often take up valuable storage space when not in use. The device illustrated, described and claimed herein provides a device that is constructed rigidly and safely for use as a trailer, yet arranged and constructed in a manner to permit it to be collapsed and folded into a minimum space when not in use.

Other and further objects of the invention will become apparent as the description proceeds and when taken in conjunction with the drawing in which Figure 1 is a side view of the assembled device in its unfolded position ready for use on the road.

Figure 2 is a rear view of the device as shown in Figure 1.

Figure 3 is a side view of the device in a folded vertical position, with its wheels extended downward from the body portion to permit it being conveyed to its storage space.

Figure 4 is a fragmentary rear view of the axle and the wheel mounting arrangement.

Figure 5 is a bottom view of the trailer in its operating position when used on the road.

Figure 6 is a fragmentary view of the bottom of the axle and wheel assembly showing the wheel locking arrangement in a position whereby the wheels are vertically disposed.

Figure 7 is a similar view as shown in Figure 6 showing the locking arrangement in a position whereby the wheel is folded toward the body.

Figure 8 is a bottom view of the trailer as shown in Figure 5 with the spring mounting folded to a position where the axle and spring are brought in contact with the bottom of the trailer body for compact folding assembly.

Figure 9 is a fragmentary side view of the toggle and link arrangement illustrating the various positions that the link takes, in phantom.

Figure 10:
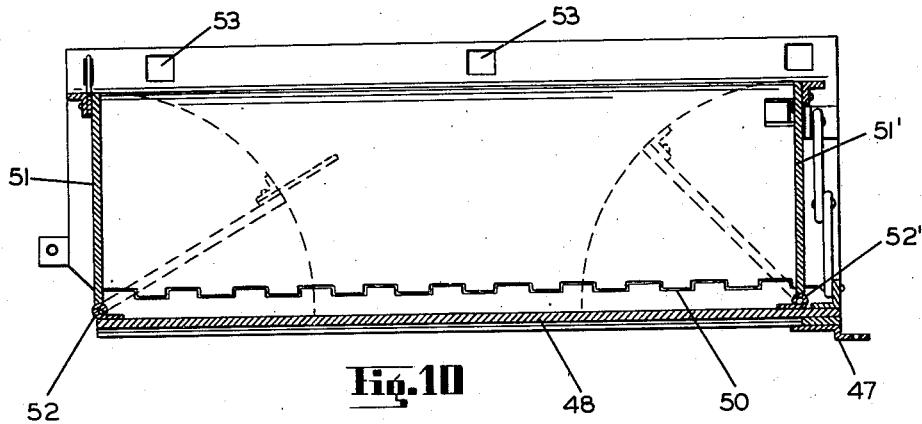
Figure 10 is a fragmentary cross-sectional view of the trailer body.
Figure 11:
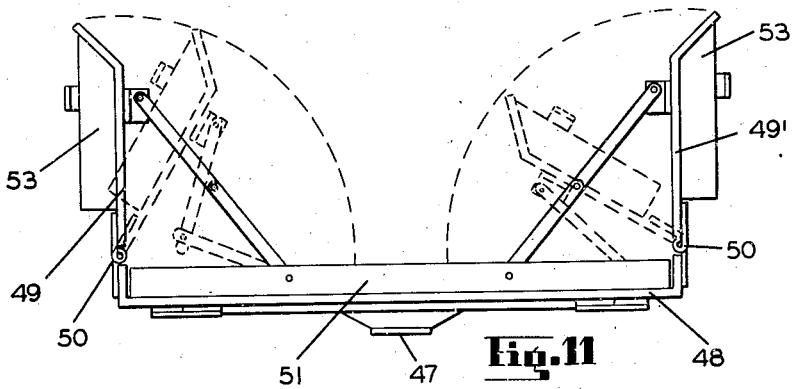
Figure 11 is a rear view of the trailer body with the front and rear tail gates folded down.
Figure 12:
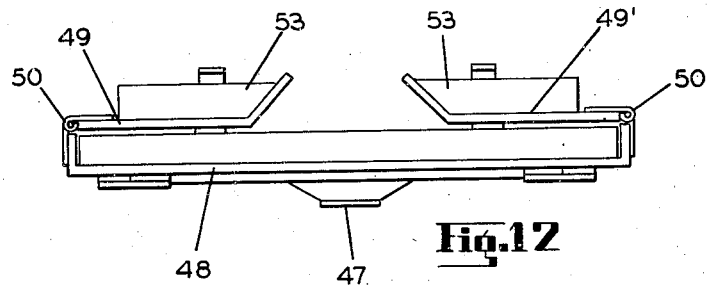
Figure 12 is a rear view of the trailer body in a folded position.

Similar characters of reference indicate corresponding parts throughout the several views and referring now to the same device primarily consists of a body portion 10, a spring mounting 11, an axle 24 at the bottom of the spring 11, wheels 13 mounted to the ends of the axle 24, the body portion 10 provided with a pair of slides 14 and 14', a rectangular frame 15 engaging the slides 14 and 14' at the bottom of said body portion 10, the frame 15 acting as a support for the draw bar 16. The frame 15 is further provided with bearings 17 rotatably supporting a cross member 18 acting as a support for the spring mounting 11.

The channels 14 and 14' attached to the bottom of the trailer by means of screws or rivets 19 act as a guide for the two channels 20 and 20' forming side members to the frame structure 15. These members 20 and 20' have bearings 17 attached thereto and these bearings 17 act as a rotatable support for a cross member shown as 18 to which the spring 11 is attached. The spring is guided within the channel 21 supported by the cross member 18. The spring 11 is further provided with shackles 22 and 22' at each of its ends, attached to extending supports 23 and 23' mounted to the top of the axle portion shown as 24.

The ends of the axle 24 are provided with shackles 25 and 25' equipped with the king pin 26 and these shackles 25 and 25' are provided with outwardly extending wheel axles shown as 27 to which the wheels 13 are rotatably attached. This leaves the wheels 13 free to fold inward by means of the hinge provided by the king pin 26 on the shackles 25 and 25', which king pin extends into the ends of the axle 24.

There is a triangular shaped hinge member 28 attached to the shackles 25 and 25'. This hinge member 28 is attached to a locking member in the form of a channel 29 by means of a link 30. The channel hinge member 29 is provided with an aperture 30' which permits a pin, not shown, to be dropped into the apertures 30' to lock the wheels in a vertical position as shown in Figure 6, and when the pin is removed the triangular bracket 28 is pulled inwardly at its upper edge by means of the link 30. The wheels 13 then fold to a position where they are longitudinal with the bottom of the trailer body 10 for storage position as shown in Figure 3. Obviously, the wheels may be locked in that position if desired, in a retrieved or storage position.

The draw bar 16 which is attached to the frame 15 at 31 is provided with a clamp 32 in the form of a spring actuated latch to retain the axle 24 in a position when it is held against the frame 15 when the device is in a folded position.

The draw bar 16 is further provided with a toggle assembly 33 consisting of a rigidly attached channel member 34 which is attached to the draw bar 16 by means of bolts or rivets shown as 35. There is a link member 36 which is hingedly attached to the channel member 34 at 37 and provided with a resilient member 38 shown in the form of an expansion spring attached to a cross rod 39 extending across the link member 36 and engaging an open slot 40 in the channels of the member 34 when the device is in an open or operating position at which time a pin, not shown, may be inserted into the apertures 41 and 41' in the member 34, and the link 36, respectively. The cross rod 39 extends across the link member 36 and acts as a support for a pair of yoke members 42 and 42', it being attached to the yoke members at each of their extreme ends. The other end of each yoke member is attached to the axle 24 at 43 and 43' by means of hinge pins 44. Thus when the toggle assembly 33 has the link member 36 in a position as shown in Figure 5 it will cause the axle 24 to be brought into direct alignment and below the shaft 18 which is hingedly attached to the frame 15 by means of the bearings 17. And when the link member 36 of the toggle assembly 33 is brought to the position as shown in Figure 8, the axle 24 will be brought against the bottom of the trailer body 10 as shown in Figure 8, and will be held in that position by means of the spring actuated clamp or latch member 32 as shown.

When the unit is folded as shown in Figure 8, the wheels may be hingedly adjusted by means of the king pin 26 to a position whereby the wheels are adjacent to the trailer body as shown in Figure 3 and the body 10 may be slidably moved by means of the frame assembly 15 engaging the slide members 14 and 14' and it may be retained in any position by inserting a pin 45 into any one of the apertures 46 in the draw bar 16 and through the bracket 47 attached to the lower end of the trailer body 10.

It is manifest to anyone skilled in the art that the frame 15 supports the body of the trailer 10 and may be slidably adjusted by virtue of its engagement with the slide plates 14 and 14' attached to the body of the bottom plate of the trailer. The frame is provided with a cross member 18 supported by bearings 17 to the frame and this cross member 18 has a channel 21 attached thereto acting as a support for the semi-elliptic spring 11 attached at both of its ends by means of shackles 22 and 22' to an axle member 24 which has the wheels 13 attached to the outer ends of the axle member 27 and pivoted by means of the king pin 26. The axle and cross member 24 and 18, respectively are held in longitudinal alignment over and above one another by means of the yoke members 42 and 42' hingedly attached to the axle member 24 and to the link member in the toggle assembly 33 attached to the draw bar 16. When the trailer body 10 is brought downward to rest onto the axle 24 the wheels 13 are folded inwardly as shown in Figure 3 by the manipulation of the hinge arrangement as shown in Figures 6 and 7, the entire unit is set on edge for storage.

Obviously, the body portion of the trailer may be of any design or shape. In the drawings is shown a box type of body that has its four sides hingedly supported to the bottom board of the trailer shown as 48. The two side boards 49 and 49' are hingedly supported at 50 to the board 48 and the end boards 51 and 51" are shown hingedly attached at 52 and 52', respectively. There are socket members 53 employed for supporting stakes, not shown. However, the shape and contour as well as the method of attachment of the side boards to the body board may be suited to the particular requirements. It is imperative, however, to fold the side boards against the bottom board and against one another to consume as little space as possible so that when the entire device is in a folded position it will take up a minimum of storage space, which after all, is the purpose for which it is intended.

It is also manifest that the device may be retained in a folded or unfolded position by means of the necessary pins as outlined in the drawing and description.

While a particular construction is shown specifically describing the component parts constituting the device and their arrangement, it is obvious that many changes in the form and configuration of the component parts may be made without in any way affecting their operativeness and the right is reserved to make such changes as may be convenient or necessary without departing from the spirit of the invention or the scope of the appended claims.

Having thus described the invention, what is claimed and desired to be secured by Letters Patent in the United States is:

1. A device of the character described comprising in combination, a body, said body having floor boards and side boards hingedly attached in a manner to permit the side boards to be folded against said floor boards, an axle extending transversely across said body, said axle provided with wheel support members hingedly attached to each of its ends, a pair of wheels, locking means attached to said axle for retaining said wheel supports in either a vertical or horizontal position, a rectangular frame, said frame slidably attached to the bottom of said body, a spring, said spring attached to said axle, a draw bar, said draw bar attached to said rectangular frame, said axle and spring hingedly attached to said body, means for adjusting said wheels from a vertical to a horizontal position, and means for adjusting said axle and spring assembly from a vertical to a horizontal position.

2. A trailer of the character described comprising a body, said body provided with a floor board and side boards hingedly attached in a manner to permit their being folded flat against said floor boards, an axle extending transversely across said body, said axle provided with wheel support members hingedly attached to each of its ends, a pair of wheels, locking means attached to said axle for retaining said wheel supports in either a vertical or a horizontal position, a rectangular frame slidably attached to the bottom of said body, a draw bar, said draw bar attached to said rectangular frame, a cross member, bearing members attached to said frame for supporting said cross member, a spring, said spring mounted to said cross member at its central point and having its outer ends attached by means of shackles to said axle, said axle and spring hingedly attached to said body by means of said cross members, means for adjusting said wheels from a vertical to a horizontal position and means for adjusting said axle and spring assembly from a vertical to a horizontal position, and means attached to said draw bar and arranged to retain the assembly in a folded or unfolded position.

3. A device of the character described comprising a body, said body provided with a floor board and side boards hingedly attached in a manner to permit their being folded flat against said floor board, an axle extending transversely across said body, said axle provided with wheel support members hingedly attached to each of its ends, a pair of wheels, locking means attached to said axle for retaining said wheel supports in either a vertical or horizontal position, said wheels disposed for engagement with said wheel supports, a rectangular frame, said frame slidably attached to the bottom of said body structure, a cross member, bearings attached to said rectangular frame for supporting said cross member, a spring member attached to said cross member, said spring member provided with shackles connecting said spring to said axle, a draw bar attached to said rectangular frame, means on said draw bar for adjusting said axle and spring assembly from a vertical to a horizontal position, and means on said axles for locking said wheel supports in either a vertical or a horizontal position.

4. A trailer of the character described comprising a body, said body provided with a floor board, an axle extending transversely across said body, said axle provided with wheel support members hingedly attached to each of its ends, a pair of wheels, locking means attached to said axle for retaining said wheel supports in either a vertical or horizontal position, said wheels rotatably mounted on said wheel supports, a rectangular frame slidably attached to the bottom board of said body, a cross member, said member provided with bearings attached to said frame for its support, a spring member attached to said cross member, said spring member provided with shackles connecting said spring to said axle member, a draw bar attached to said frame member, said draw bar provided with a toggle arrangement having yoke members pivotally attached thereto at one end, the other end of said yoke members pivotally attached to said axle for folding said axle and spring arrangement against the bottom of said trailer board, and means for adjusting said axle and spring assembly from a vertical to a horizontal position.

5. A trailer of the character described comprising in combination a body, said body provided with floor board and side boards hingedly attached to one another in a manner to permit their being folded flat against one another, an axle extending transversely across the body, said axle provided with wheel support members hingedly attached to each of its ends, a pair of wheels, said wheels arranged for engagement with said wheel support members, means attached to said axle for retaining said wheel support members in either a vertical or horizontal position, a rectangular frame slidably attached to the bottom of said trailer, a cross member, bearings attached to the frame for supporting said cross member, a spring member attached to said cross member, said spring member provided with a pair of shackles connecting said spring to said axle member, a draw bar attached to said frame member, said draw bar provided with a toggle arrangement having a yoke member pivotally attached thereto at one end, the other end of said yoke member pivotally attached to said axle for the purpose of permitting said axle and spring assembly to be folded against the bottom of said trailer, means for retaining said axle and spring assembly adjacent to the lower face of said body when said axle and spring are in a folded position, locking means on said draw bar for retaining said frame structure and body at any pre-determined position, means for adjusting said wheels from a vertical to a horizontal position, and means for adjusting said axle and spring arrangement from a vertical to a horizontal position.

MINNIE WITT.
*Executrix of the Estate of Adelbert M. Nelson, Deceased.*

REFERENCES CITED

The following references are of record in the file of this patent:

UNITED STATES PATENTS

| Number | Name | Date |
|---|---|---|
| 226,138 | Welsh | Mar. 30, 1880 |
| 414,577 | Pladeck | Nov. 5, 1889 |
| 1,652,190 | Wills | Dec. 13, 1927 |

FOREIGN PATENTS

| Number | Country | Date |
|---|---|---|
| 156,845 | Germany | Mar. 21, 1904 |